(12) United States Patent
Yi et al.

(10) Patent No.: US 8,018,991 B2
(45) Date of Patent: Sep. 13, 2011

(54) APPARATUS AND METHOD FOR ESTIMATING CARRIER-TO-INTERFERENCE AND NOISE RATIO IN A COMMUNICATION SYSTEM

(75) Inventors: Byoung Ha Yi, Seoul (KR); Ki-Young Han, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 677 days.

(21) Appl. No.: 12/127,489

(22) Filed: May 27, 2008

(65) Prior Publication Data

US 2008/0298451 A1 Dec. 4, 2008

(30) Foreign Application Priority Data

May 28, 2007 (KR) .................. 10-2007-0051741

(51) Int. Cl.
*H04B 17/00* (2006.01)

(52) U.S. Cl. ........ 375/227; 375/346; 375/260; 375/285; 375/316; 375/349; 375/340; 370/210; 370/338; 456/135; 456/226.3; 456/67.1; 456/63.1; 456/296

(58) Field of Classification Search .................. 375/227, 375/346, 260, 285, 316, 349, 340; 370/210, 370/338; 455/135, 226.3, 67.1, 63.1, 67.13, 455/296

See application file for complete search history.

(56) References Cited

U.S. PATENT DOCUMENTS

| 7,603,092 B2 * | 10/2009 | Yu et al. ............... 455/226.1 |
| 7,623,569 B2 * | 11/2009 | Chang et al. ............ 375/227 |
| 7,860,047 B2 * | 12/2010 | Urushihara et al. ...... 370/328 |
| 2006/0008037 A1 | 1/2006 | Chang et al. |
| 2006/0093074 A1 * | 5/2006 | Chang et al. ........... 375/340 |
| 2007/0104256 A1 * | 5/2007 | Kimura ............... 375/150 |

FOREIGN PATENT DOCUMENTS

| KR | 10-2005-0074884 A | 7/2005 |
| KR | 10-2006-0001734 A | 1/2006 |
| KR | 10-2006-0037806 A | 5/2006 |
| KR | 10-0668662 B1 | 1/2007 |

* cited by examiner

*Primary Examiner* — Chieh M Fan
*Assistant Examiner* — Siu Lee
(74) *Attorney, Agent, or Firm* — Jefferson IP Law, LLP (57) ABSTRACT

An apparatus and method for estimating a Carrier-to-Interference and Noise Ratio (CINR) in a communication system are provided. In the apparatus and method a signal having a traffic allocation available area that includes a preamble allocation available area is generated by Fast Fourier Transform (FFT)-processing a received symbol, power values of preamble tones included in the preamble allocation available area are calculated, a carrier power value is calculated using the power values of the preamble tones, a partial noise-interference power value is calculated using power differences between the preamble tones and power values of remaining tones other than the preamble tones, a noise power value is calculated using power values of tones included in a noise power estimation area being an area except for the preamble allocation available area in the traffic allocation available area, and the CINR is calculated using the carrier power value, the partial noise-interference power value, and the noise power value.

16 Claims, 7 Drawing Sheets

APPARATUS AND METHOD FOR ESTIMATING CARRIER-TO-INTERFERENCE AND NOISE RATIO IN A COMMUNICATION SYSTEM

PRIORITY

This application claims the benefit under 35 U.S.C. §119 (a) of a Korean patent application filed in the Korean Intellectual Property Office on May 28, 2007 and assigned Serial No. 2007-51741, the entire disclosure of which is hereby incorporated by reference.

BACKGROUND OF THE INVENTION

1. Field of the Invention

The present invention relates to a communication system. More particularly, the present invention relates to a method and apparatus for estimating Carrier-to-Interference and Noise Ratio (CINR) in a communication system.

2. Description of the Related Art

Future-generation communication systems are under development to provide services capable of high-speed, large-data transmission and reception to Mobile Stations (MSs). An example of a future-generation communication system is an Institute of Electrical and Electronics Engineers (IEEE) 802.16 system.

The IEEE 802.16 communication system uses Orthogonal Frequency Division Multiplexing (OFDM) that offers the benefits of Inter-Symbol Interference (ISI) cancellation through a simple equalizer, robustness against noise, and high frequency use efficiency.

The IEEE 802.16 communication system adopts Adaptive Modulation and Coding (AMC) to efficiently transmit data. AMC is a transmission scheme in which an optimal Modulation and Coding Scheme (MCS) level is adaptively selected from among preset MCS levels according to a change in a channel environment and data is encoded and modulated at the selected MCS level prior to transmission.

For implementation of AMC, an MS feeds back channel status information about a radio channel to a Base Station (BS). Specifically, the MS estimates the CINR of a received signal as the channel status information and feeds back the CINR estimate to the BS.

If the BS uses a self-configurable technology, it determines optimal operation parameters based on channel status information about signals received from neighbor BSs. The self-configurable technology is a technology for automatically setting operation parameters such as a transmit power and a Frequency Assignment (FA) to efficiently transmit data. To do so, the BS estimates the CINRs of the received signals as the channel status information about the neighbor BSs and determines optimal operation parameters based on the estimated CINRs.

The CINR of a BS can be estimated using a preamble signal.

Figure 1:
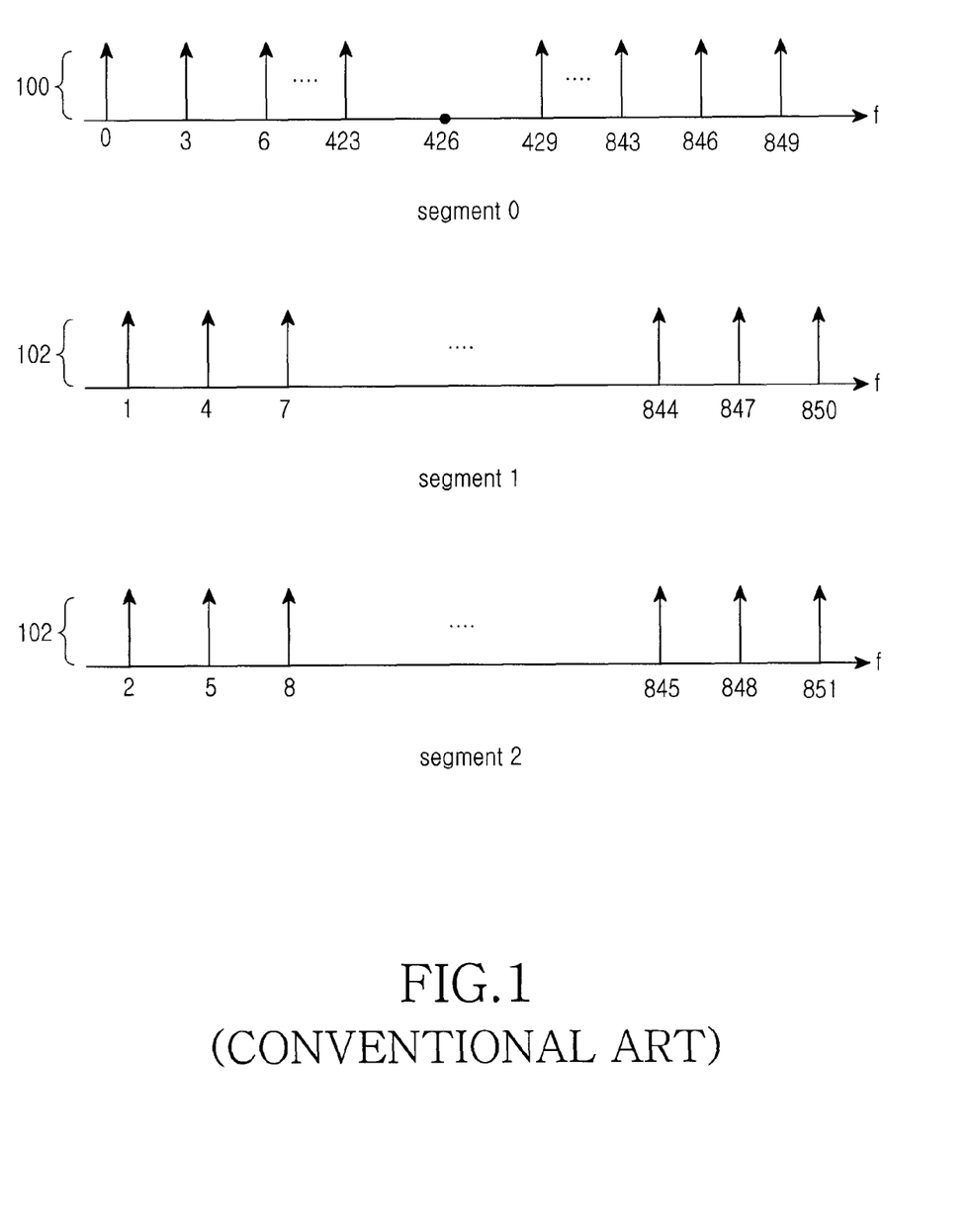
FIG. 1 illustrates a conventional method for allocating a preamble signal to subcarriers in a BS.
Figure 2:
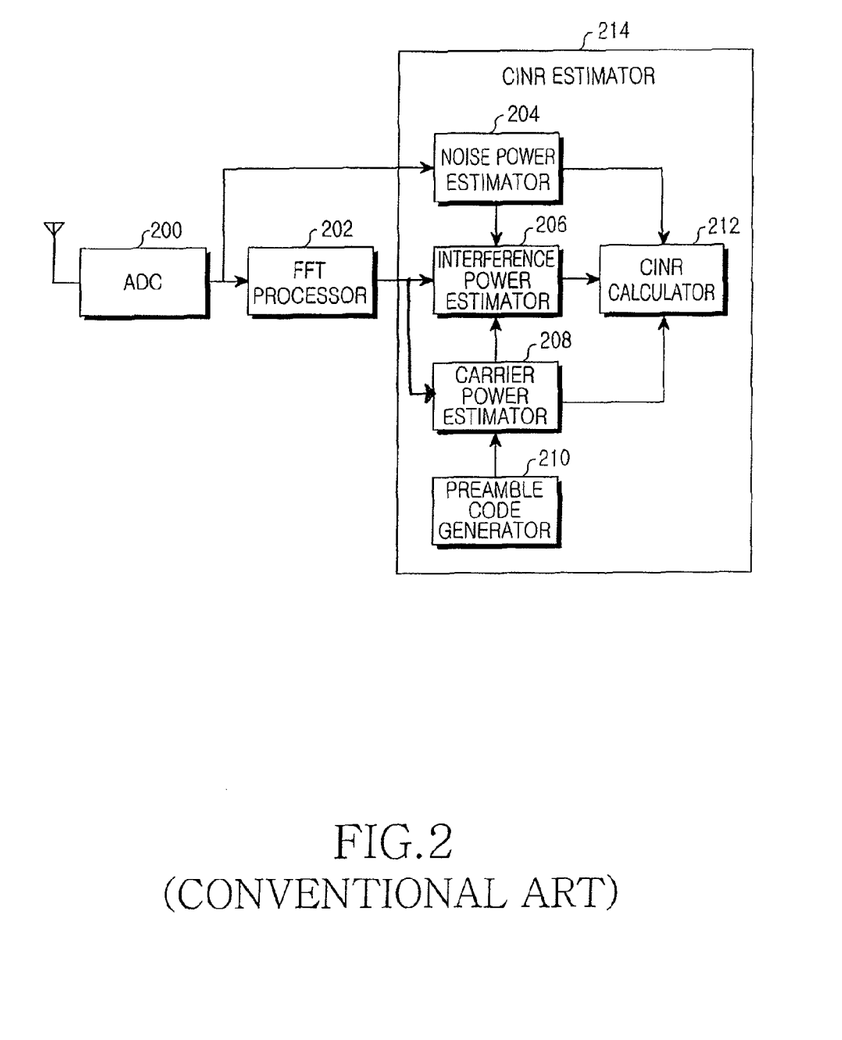
FIG. 2 is a block diagram of an MS for estimating a CINR according to a conventional technology.

With reference to FIGS. 1 and 2, the manner in which an MS estimates a CINR will be described. FIG. 1 illustrates a conventional method for allocating a preamble signal to subcarriers in a BS.

The BS transmits a preamble signal to the MS in the first of OFDM symbols that form a downlink frame. The preamble signal is a sync signal to establish synchronization between the BS and the MS. More specifically, the BS defines a preamble allocation available area in the first OFDM symbol and maps preamble tones that form a preamble signal to part or all of the subcarriers of the preamble allocation available area according to a preset preamble allocation scheme. Then the BS eliminates the remaining subcarriers, except for the subcarriers having the preamble tones, and transmits the preamble signal to the MS.

The preamble allocation can be considered in three ways depending on the position of the preamble signal in the OFDM symbol. As illustrated in FIG. 1, preamble tones are allocated every three subcarriers, starting from subcarrier 0 in the preamble allocation available area (a segment 0 scheme 100), every three subcarriers, starting from subcarrier 1 in the preamble allocation available area (a segment 1 scheme 102), or every three subcarriers, starting from subcarrier 2 in the preamble allocation available area (a segment 2 scheme 104).

The BS transmits the preamble signal to the MS in the OFDM symbol using one of the above three preamble allocation schemes. The MS then receives the OFDM symbol and estimates the CINR of the OFDM symbol using the preamble signal. With reference to FIG. 2, a conventional operation for estimating the CINR in the MS will be described below.

Referring to FIG. 2, the MS includes an Analog-to-Digital Converter (ADC) 200, a Fast Fourier Transform (FFT) processor 202, and a CINR estimator 214. The CINR estimator 214 has a noise power estimator 204, an interference power estimator 206, a carrier power estimator 208, a preamble code generator 210, and a CINR calculator 212.

The ADC 200 converts a preamble signal received through an antenna to a digital preamble signal. The FFT processor 202 generates a digital FFT preamble signal by FFT-processing the digital preamble signal received from the ADC 200 on an OFDM symbol basis.

The noise power estimator 204 estimates a noise power value using the digital preamble signal received from the ADC 200. The preamble code generator 210 generates a preamble code with which to demodulate the digital FFT preamble signal. The carrier power estimator 208 receives the digital FFT preamble signal from the FFT processor 202 and the preamble code from the preamble code generator 210, demodulates the digital FFT preamble signal using the preamble code, and estimates a carrier power value using the demodulated digital preamble signal.

The interference power estimator 206 calculates the signal power value of the digital FFT preamble signal received from the FFT processor 202, calculates an interference power value using the signal power value, the noise power value, and the carrier power value. Herein, the interference power estimator 206 can calculate the interference power value by subtracting the carrier power value and the noise power value from the signal power value. The CINR calculator 212 calculates a CINR using the noise power value, the interference power value, and the carrier power value.

In the above-described conventional CINR estimation method, the carrier power value and the noise power value are subtracted from the signal power value. However, when the preamble signal has no interference or the magnitude of the interference is negligibly small, there is an error between the interference power value calculated by the CINR estimator 214 and a real interference power value. As a consequence, the estimated CINR is less accurate.

Moreover, the noise power is estimated using the time-domain preamble signal in the conventional CINR estimation method. If an actual CINR of the preamble signal is large in a multi-path environment, there is an error between the noise power value calculated by the CINR estimator 214 and a real noise power value. As a consequence, the estimated CINR is less accurate.

SUMMARY OF THE INVENTION

An aspect of the present invention is to address at least the above-mentioned problems and/or disadvantages and to provide at least the advantages described below. Accordingly, an aspect of the present invention is to provide a method and apparatus for estimating a CINR in a communication system.

Another aspect of the present invention provides a method and apparatus for accurately estimating an interference power value, even when there is no interference or when the magnitude of the interference is negligibly small in an actual preamble signal in a communication system.

A further aspect of the present invention provides a method and apparatus for accurately estimating a noise power value, even when an actual CINR of a preamble signal is large under a multi-path environment in a communication system.

In accordance with an aspect of the present invention, a method for estimating a CINR in a communication system is provided. The method includes generating a signal, including a traffic allocation available area for allocating a traffic signal and a preamble allocation available area for allocating a preamble signal, by FFT-processing a received OFDM symbol, the traffic allocation available area comprising the preamble allocation available area, calculating power values of preamble tones included in the preamble allocation available area, calculating a carrier power value using the power values of the preamble tones, calculating a partial noise-interference power value using power differences between the preamble tones and power values of remaining tones other than the preamble tones, calculating a noise power value using power values of tones included in a noise power estimation area, the power estimation area being an area of the traffic allocation available area other than the preamble allocation available area, and calculating the CINR using the carrier power value, the partial noise-interference power value, and the noise power value.

In accordance with another aspect of exemplary embodiments of the present invention, an apparatus for estimating a CINR in a communication system is provided. The apparatus includes an FFT processor for generating a signal, including a traffic allocation available area for allocating a traffic signal and a preamble allocation available area for allocating a preamble signal, by FFT-processing a received symbol, the traffic allocation available area comprising the preamble allocation available area, a carrier power estimator for calculating power values of preamble tones included in the preamble allocation available area and for calculating a carrier power value using the power values of the preamble tones, a partial noise-interference power estimator for calculating a partial noise-interference power value using power differences between the preamble tones and power values of remaining tones other than the preamble tones, a noise power estimator for calculating a noise power value using power values of tones included in a noise power estimation area, the power estimation area being an area of the traffic allocation available area other than the preamble allocation available area, and a CINR calculator for calculating the CINR using the carrier power value, the partial noise-interference power value, and the noise power value.

In accordance with a further aspect of exemplary embodiments of the present invention, a method for estimating interference and noise in a communication system is provided. The method includes generating a signal, including a traffic allocation available area for allocating a traffic signal and a preamble allocation available area for allocating a preamble signal, by FFT-processing a received symbol, the traffic allocation available area comprising the preamble allocation available area, calculating a partial noise-interference power value using power differences between preamble tones included in the preamble allocation available area and power values of remaining tones other than the preamble tones in the preamble allocation available area, calculating a noise power value using power values of tones included in a noise power estimation area, the power estimation area being an area of the traffic allocation available area other than the preamble allocation available area, and calculating the interference and noise using the partial noise-interference power value and the noise power value.

In accordance with still another aspect of exemplary embodiments of the present invention, an apparatus for estimating interference and noise in a communication system is provided. The apparatus includes an FFT processor for generating a signal, including a traffic allocation available area for allocating a traffic signal and a preamble allocation available area for allocating a preamble signal, by FFT-processing a received symbol, the traffic allocation available area comprising the preamble allocation available area, a partial noise-interference power estimator for calculating a partial noise-interference power value using power differences between preamble tones included in the preamble allocation available area and power values of remaining tones other than the preamble tones in the preamble allocation available area, a noise power estimator for calculating a noise power value using power values of tones included in a noise power estimation area, the power estimation area being an area of the traffic allocation available area other than the preamble allocation available area, and a interference and noise calculator for calculating the interference and noise using the partial noise-interference power value and the noise power value.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method and apparatus for estimating a CINR in a communication system.

While the CINR estimation method and apparatus can be applied to any communication system, the communication system is preferably an OFDM communication system.

Figure 3:
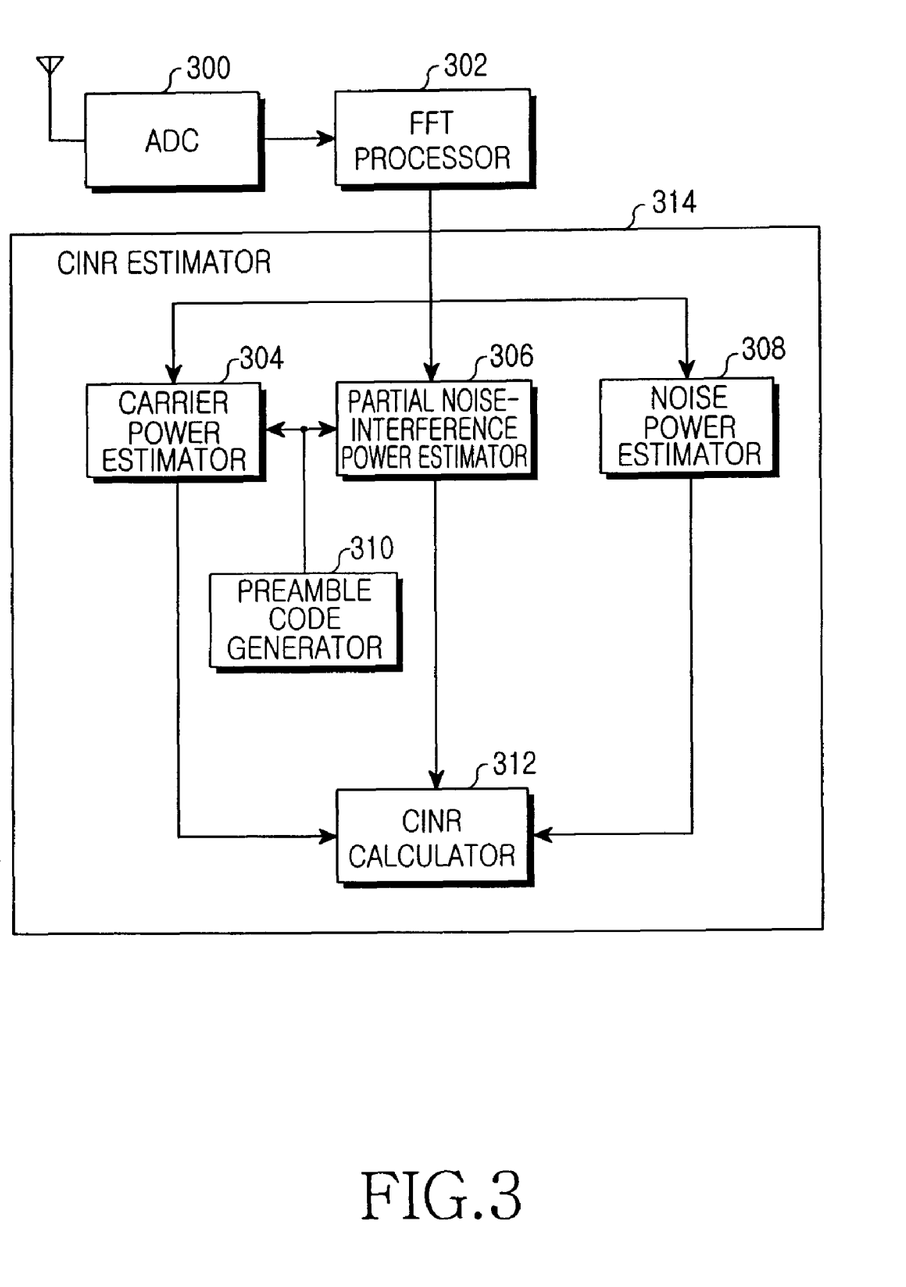
FIG. 3 is a block diagram of an MS according to an exemplary embodiment of the present invention.

FIG. 3 is a block diagram of an MS according to an exemplary embodiment of the present invention.

Referring to FIG. 3, the MS includes an ADC 300, an FFT processor 302, and a CINR estimator 314. The CINR estimator 314 has a carrier power estimator 304, a partial noise-interference power estimator 306, a noise power estimator 308, a preamble code generator 310, and a CINR calculator 312.

The ADC 300 converts a signal included in a first OFDM symbol of a downlink frame received from a BS into a digital signal. The first OFDM symbol includes a preamble allocation available area that carries a preamble signal and an interference and noise signal.

The FFT processor 302 FFT-processes a digital preamble signal received from the ADC 300 on an OFDM symbol basis. The preamble code generator 310 generates a preamble code with which to demodulate the preamble signal.

The carrier power estimator 304 receives the FFT preamble signal from the FFT processor 304 and the preamble code from the preamble code generator 310, demodulates the FFT preamble signal with the preamble code, and calculates a power value of the demodulated preamble signal as a carrier power value.

To be more specific, for the inputted FFT preamble signal and the preamble code, the carrier power estimator 304 multiplies the preamble tones of the FFT preamble signal by the preamble code, thus producing X[3k+seg]·C[k]. The carrier power estimator 304 calculates the complex conjugate of X[3k+seg]·C[k] and then calculates a differential correlation between X[3k+seg]·C[k] and its complex conjugate. The carrier power estimator 304 calculates the carrier power value by extracting only the real part of the differential correlation and scales the carrier power value. The carrier power value can be computed by $$P_c = \frac{1}{N_{code} - 3} \text{Re} \left\{ \sum_{\substack{k=0 \\ k \neq 141,142}}^{N_{code}-2} X^*[3 \cdot k + seg] \cdot X[3 \cdot (k+1) + seg] \cdot C[k] \cdot C[k+1] \right\} \quad (1)$$

where k denotes the index of a subcarrier to which a preamble tone is allocated, X[k] denotes a $k^{th}$ FFT subcarrier, C[k] denotes an element of the preamble code corresponding to the $k^{th}$ subcarrier, $N_{code}$ denotes a number of columns of the preamble code, and seg denotes an index indicating a current segment scheme. For example, for segment 0, seg is set to 0 and for segment 1, seg is set to 1.

The partial noise-interference power estimator 306 demodulates the FFT preamble signal received from the FFT processor 302 with the preamble code received from the preamble code generator 310 and calculates power values for all of the preamble tones using the demodulated preamble signal. The partial noise-interference power estimator 306 also calculates the inter-preamble tone power difference of every preamble tone by comparing the power value of the preamble tone with those of preamble tones adjacent to the preamble tone, and calculates a final inter-preamble tone power difference for all of the preamble tones. The partial noise-interference power estimator 306 also calculates a power value of the remaining tones except for the preamble tones. Then the partial noise-interference power estimator 306 calculates a partial noise-interference power value based on the final inter-preamble tone power difference and the power value of the tones other than the preamble tones.

Figure 4A:
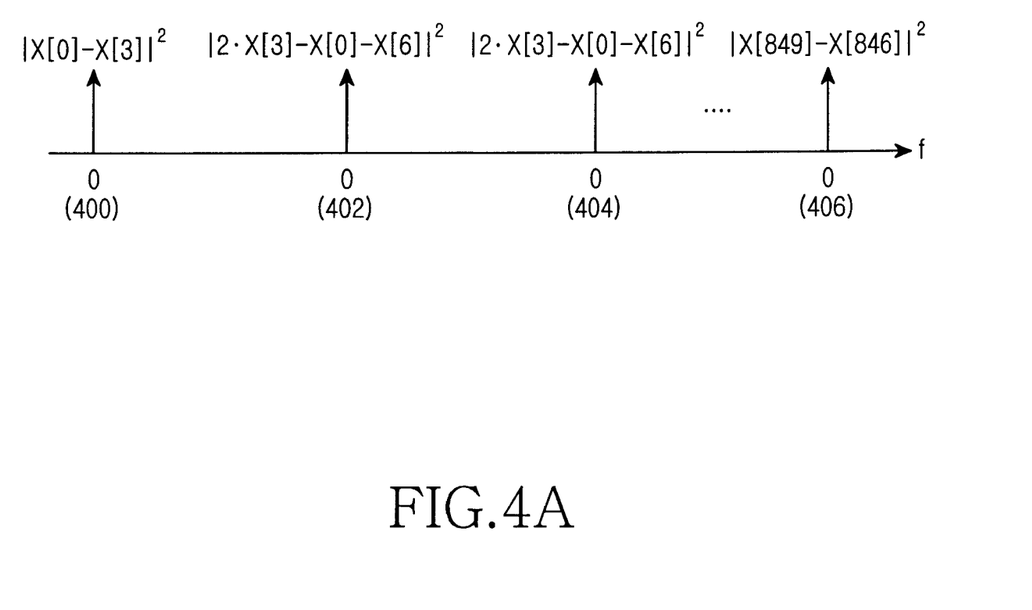
FIG. 4A illustrates an operation for estimating a noise-interference power value in the MS according to an exemplary embodiment of the present invention.

FIG. 4A illustrates an operation for calculating the inter-preamble tone power differences of preamble tones to estimate the noise-interference power value in the MS according to an exemplary embodiment of the present invention.

For notational simplicity, it is assumed that preamble tones are allocated to the first OFDM symbol of a downlink frame according to the segment 0 scheme.

The partial noise-interference power estimator 306 calculates the power values of a $0^{th}$ subcarrier 400 and a $3^{rd}$ subcarrier 402 in a preamble signal in order to calculate the inter-preamble tone power difference of the $0^{th}$ subcarrier 400. Then the partial noise-interference power estimator 306 calculates the inter-preamble tone power difference of the $0^{th}$ subcarrier 400 by comparing the power values.

To calculate the inter-preamble tone power difference of the $3^{rd}$ subcarrier 402, the partial noise-interference power estimator 306 calculates the power values of the $0^{th}$ subcarrier 400 and a $6^{th}$ subcarrier 404 carrying preamble tones adjacent to a preamble tone on the $3^{rd}$ subcarrier 402 and then calculates the inter-preamble tone power difference of the $3^{rd}$ subcarrier 402 by summing the power difference between the $0^{th}$ and $3^{rd}$ subcarriers 400 and 402 and the power difference between the $3^{rd}$ subcarrier 402 and the $6^{th}$ subcarrier 404.

In this manner, the partial noise-interference power estimator 306 calculates the inter-preamble tone power difference of an $849^{th}$ subcarrier 406. If a preamble tone is not mapped to a $410^{th}$ subcarrier, the partial noise-interference power estimator 306 does not calculate the inter-preamble tone power difference of the $410^{th}$ subcarrier. Then, the partial noise-interference power estimator 306 sums the inter-preamble tone power differences for all of the preamble tones, thus creating a final inter-preamble tone power difference.

The partial noise-interference power estimator 306 also calculates a power value of the remaining tones other than the preamble tones. Then the partial noise-interference power estimator 306 calculates a partial noise-interference power value using the final inter-preamble tone power difference and the power value of the remaining tones by $$NI_{par} = \frac{\sum_{\substack{i=0 \\ i \neq seg}}^{2} \left( \sum_{\substack{k=0 \\ k \neq 142}}^{N_{code}-1} |X[3 \cdot k + i]|^2 \right) + NI_{seg}}{N_{code} - 1} \quad (2)$$

$$NI_{seg} = |X[seg]C[0] - X[3+seg]C[1]|^2/2 -$$
$$|X[3 \cdot 140 + seg]C[141] - X[3 \cdot 140 + seg]C[140]|^2/2 +$$
$$\sum_{k=1}^{140} (|2 \cdot X[3 \cdot k + seg]C[k] - X[3 \cdot (k-1) - seg]C[k-1] -$$
$$X[3 \cdot (k+1) + seg]C[k+1]|^2/6) +$$
$$|X[3 \cdot 143]C[143] - X[3 \cdot 144 + seg]C[144]|^2/2 -$$
$$|X[3 \cdot 283 + seg]C[283] - X[3 \cdot 282 - seg]C[282]|^2/2 +$$
$$\sum_{k=144}^{282} (|2 \cdot X[3 \cdot k + seg]C[k] - X[3 \cdot (k-1) + seg]C[k-1] -$$
$$X[3 \cdot (k+1) + seg]C[k+1]|^2/6)$$

where $NI_{par}$ denotes the partial noise-interference power value, $NI_{seg}$ denotes the final inter-preamble tone power difference, k denotes an index of a subcarrier to which a preamble tone is allocated, X[k] denotes a $k^{th}$ FFT subcarrier signal, C[k] denotes an element of the preamble code corresponding to the $k^{th}$ subcarrier, $N_{code}$ denotes a number of columns of the preamble code, and seg denotes an index indicating a current segment scheme.

Figure 4B:
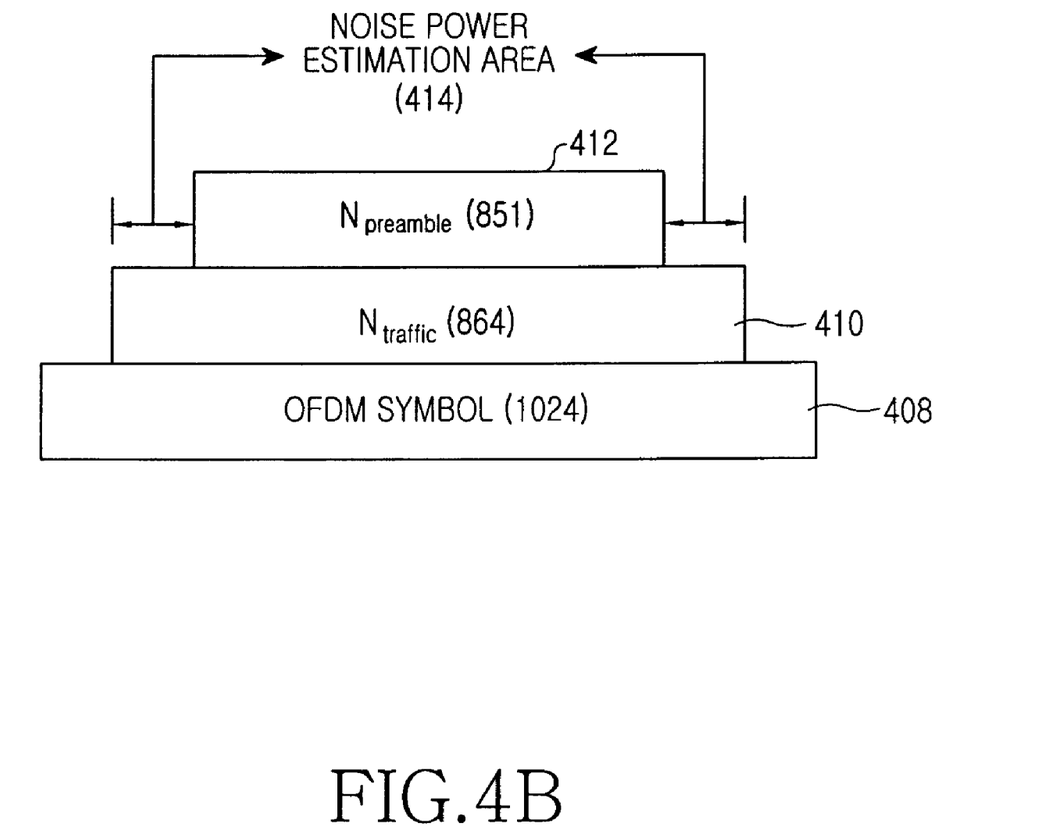
FIG. 4B illustrates a noise power estimation area used for estimating a noise power in the MS according to an exemplary embodiment of the present invention.

FIG. 4B illustrates a noise power estimation area used for estimating a noise power in the MS according to an exemplary embodiment of the present invention. Referring to FIG. 4B, there is a traffic allocation available area 410 and a preamble allocation available area 412 in an OFDM symbol 408. A traffic signal is allocated in the traffic allocation available area 410 and a preamble signal is allocated in the preamble allocation available area 412.

For example, when a traffic signal is carried in the OFDM symbol 408, the BS can allocate the traffic signal in the traffic allocation available area 410 of the OFDM symbol 408. When a preamble signal is delivered in the OFDM symbol 408, the BS can allocate the preamble signal in the preamble allocation available area 412 of the OFDM symbol 408.

The remaining area of the traffic allocation available area 410 other than the preamble allocation available area 412 is referred to as a noise power estimation area 414. The noise power estimation area 414 is not affected by a multi-path environment.

Therefore, the noise power estimator 308 estimates a noise power value, which is not affected by the effects of the multi-path environment, using the power values of tones included in the noise power estimation area 414.

The noise power value is estimated by $$N = \frac{1}{N_{traffic} - N_{preamble}} \left( \sum_{k=-L}^{-l} X[k]^2 + \sum_{k=N_{preamble}}^{N_{preamble}+L} X[k]^2 \right) \quad (3)$$

$$L = \text{floor}\left(\frac{N_{traffic} - N_{preamble}}{2}\right)$$

where $N_{preamble}$ denotes a number of subcarriers allocated to the preamble allocation available area, $N_{traffic}$ denotes a number of subcarriers allocated to the traffic allocation available area, L denotes half of a number of subcarriers allocated to the noise power estimation area, k denotes an index of a subcarrier to which a preamble tone is allocated, and X[k] denotes a $k^{th}$ FFT subcarrier signal.

The CINR calculator 312 calculates a CINR value based on the carrier power value, the partial noise-interference power value, and the noise power value received from the carrier power estimator 304, the partial noise-interference power estimator 306, and the noise power estimator 308. Specifically, the CINR calculator 312 acquires a scaled noise power value by multiplying the noise power value received from the noise power estimator 308 by a boosted carrier power voltage. Then it calculates an interference and noise power value by summing the partial noise-interference power value and the scaled noise power value and calculates a CINR by dividing the carrier power value by the interference and noise power value. The CINR calculation is described as $$CINR = \frac{P_c}{NI_{par} + N(P_{bc} - 3)} \quad (4)$$

where $P_{bc}$ denotes a boosted carrier power gain, N denotes the noise power value, $NI_{par}$ denotes the partial noise-interference power value, and $P_c$ denotes the carrier power value.

Figure 5:
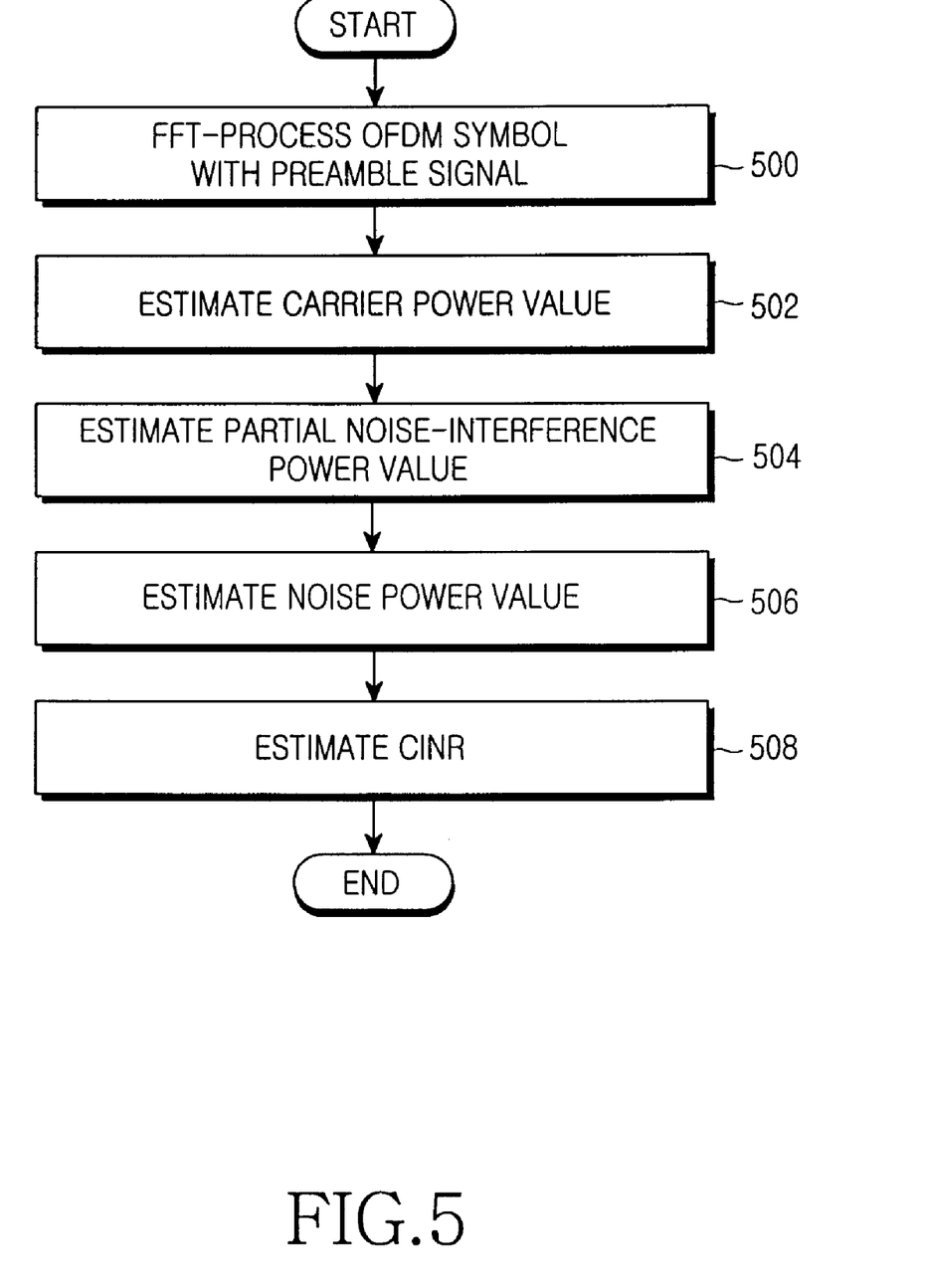
FIG. 5 is a flowchart illustrating an operation for estimating a CINR in the MS according to an exemplary embodiment of the present invention.

FIG. 5 is a flowchart illustrating an operation for estimating a CINR in the MS according to an exemplary embodiment of the present invention.

Referring to FIG. 5, the ADC 300 converts an OFDM symbol including a preamble signal into a digital signal and the FFT processor 302 FFT-processes the digital OFDM symbol in step 500.

In step 502, the carrier power estimator 304 estimates, as a carrier power value, the power value of the preamble signal included in the FFT OFDM symbol received from the FFT processor 302.

For example, if n preamble tones form a preamble signal, the carrier power estimator 304 demodulates an FFT preamble signal with a preamble code of length n received from the preamble code generator 301 and calculates the carrier power value of the demodulated preamble signal by equation (1).

The partial noise-interference power estimator 306 receives the FFT OFDM symbol, calculates a final inter-preamble tone power difference of the preamble tones of the preamble signal and a power value of the other tones except for the preamble tones using the FFT OFDM symbol, and estimates a partial noise-interference power value using the final inter-preamble tone power difference and the power values of the other tones in step 504.

For example, the partial noise-interference power estimator 306 demodulates the FFT preamble signal with the preamble code, calculates the inter-preamble tone power differences for all of the preamble tones that form the demodulated preamble signal, and sums the inter-preamble tone power differences, thus creating the final inter-preamble tone power difference. The partial noise-interference power estimator 306 also calculates the power values of the other tones except for the preamble tones. The partial noise-interference power estimator 306 calculates the partial noise-interference power value by summing the sum of the power values of the other tones and the final inter-preamble tone power difference and scaling the sum according to equation (2).

In step 506, the noise power estimator 308 estimates a noise power value using a signal included in the noise power estimation area 414 of the FFT OFDM symbol.

For example, the noise power estimator 308 can calculate the noise power value of tones included in the noise power estimation area 414 of the FFT OFDM symbol by equation (3).

The CINR calculator 312 estimates a CINR using the carrier power value, the partial noise-interference power value, and the noise power value in step 508.

For example, the CINR calculator 312 calculates a final noise power value by multiplying the noise power by $P_{bc}-3$ and sums the final noise power value and the partial noise-interference power value, thereby creating an interference and noise power value. The CINR calculator 312 then calculates the CINR by dividing the interference and noise power value by the carrier power value by equation (4).

Figure 6:
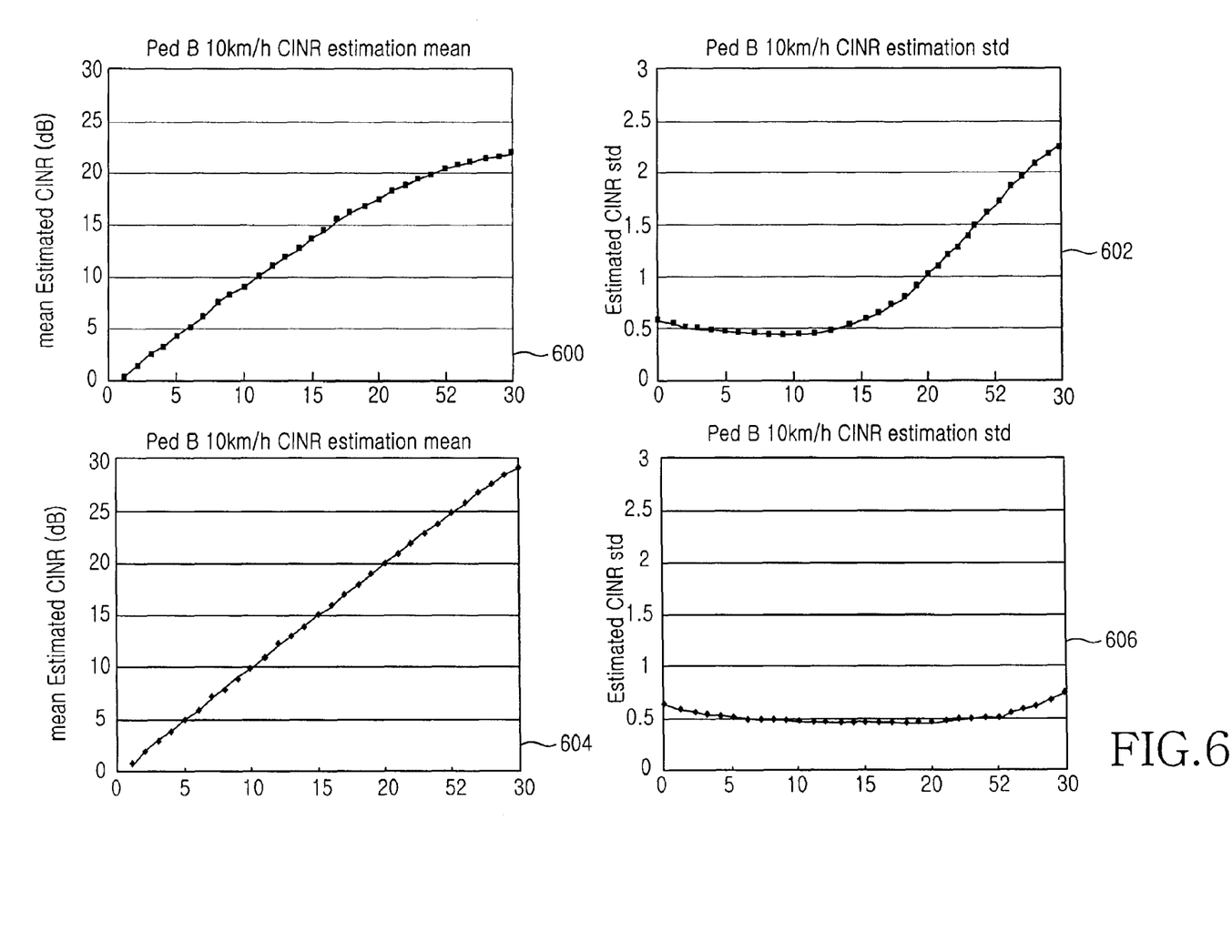
FIG. 6 is a compilation of graphs illustrating the standard deviations and means of CINRs measured by the MS according to an exemplary embodiment of the present invention.

FIG. 6 is a compilation of graphs illustrating the standard deviations and means of CINRs measured by the MS according to an exemplary embodiment of the present invention.

Referring to FIG. 6, graphs 600 and 602 represent CINR mean values and CINR standard deviations, respectively, when the MS estimates CINRs according to conventional technology. Graphs 604 and 606 represent CINR mean values and CINR standard deviations, respectively, when the MS estimates CINRs according to an exemplary embodiment of the present invention. It is assumed herein that the CINRs are estimated in an ITU-R channel model with an MS's velocity of 10 km/h.

In the graph 600, the x axis represents CINRs in a real channel environment and the y axis represents the mean values of CINRs estimated by the MS. A first CINR estimation performance curve can be drawn with the CINR values on the x axis and the CINR means values on the y axis. Although the first CINR estimation performance curve has linear characteristics in a CINR range of approximately 0 to 15 dB on the x axis, it loses the linearity above a CINR value of approximately 15 dB.

In the graph 602, the x axis represents CINRs in the real channel environment and the y axis represents the standard deviations of CINRs estimated by the MS. A second CINR estimation performance curve can be drawn with the CINR values on the x axis and the standard deviations of the CINRs on the y axis. Although the second CINR estimation performance curve converges to a certain value in a CINR range of approximately 0 to 15 dB on the x axis, it fluctuates considerably above a CINR value of approximately 15 dB.

That is, the conventional CINR estimation results in inaccurate CINR estimates and causes errors, as the CINR values of the real channel environment increase. These errors increase with the CINR values of the real channel environment.

In the graph 604, the x axis represents CINRs in a real channel environment and the y axis represents the mean values of CINRs estimated by the MS. A first CINR estimation performance curve can be drawn with the CINR values on the x axis and the CINR means values on the y axis. The first CINR estimation performance curve has linear characteristics.

In the graph 606, the x axis represents CINRs in the real channel environment and the y axis represents the standard deviations of CINRs estimated by the MS. A second CINR estimation performance curve can be drawn with the CINR values on the x axis and the standard deviations of the CINRs on the y axis. The second CINR estimation performance curve converges to a certain value.

That is, the CINR estimation method of the present invention enables the MS to accurately estimate CINRs even though CINRs increase in a real channel environment.

As is apparent from the above description, exemplary embodiments of the present invention advantageously enable accurate CINR estimation since a partial noise-interference power value and a noise power value can be calculated even when there is no interference, when interference is negligibly small in an actual preamble signal, or when the actual CINR of a preamble signal is large in a multi-path environment.

While the invention has been shown and described with reference to certain exemplary embodiments of the present invention thereof, they are mere exemplary embodiments. For example, while it has been described that an MS is responsible for CINR estimation, a BS can estimate a CINR according to the present invention. Thus, it will be understood by those skilled in the art that various changes in form and details may be made therein without departing from the spirit and scope of the invention as defined by the appended claims and their equivalents.

What is claimed is:

1. A method for estimating a Carrier-to-Interference and Noise Ratio (CINR) in a communication system, comprising:
1) generating a signal, including a traffic allocation available area for allocating a traffic signal and a preamble allocation available area for allocating a preamble signal, by Fast Fourier Transform (FFT)-processing a received symbol, the traffic allocation available area comprising the preamble allocation available area;
2) calculating power values of preamble tones included in the preamble allocation available area;
3) calculating a carrier power value using the power values of the preamble tones;
4) calculating a partial noise-interference power value using, (a) power differences between the preamble tones and (b) power values of remaining tones other than the preamble tones;
5) calculating a noise power value using power values of tones included in a noise power estimation area, the noise power estimation area being an area of the traffic allocation available area other than the preamble allocation available area; and
6) calculating the CINR using the carrier power value, the partial noise-interference power value, and the noise power value.

2. The method of claim 1, wherein the calculating of the partial noise-interference power value comprises calculating the partial noise-interference power value by the equation, $$NI_{par} = \frac{\sum_{\substack{i=0 \\ i \neq seg}}^{2} \left( \sum_{\substack{k=0 \\ k \neq 142}}^{N_{code}-1} |X[3 \cdot k + i]|^2 \right) + NI_{seg}}{N_{code} - 1}$$

$$NI_{seg} = |X[seg]C[0] - X[3+seg]C[1]|^2/2 -$$
$$|X[3 \cdot 140 + seg]C[141] - X[3 \cdot 140 + seg]C[140]|^2/2 +$$
$$\sum_{k=1}^{140} (|2 \cdot X[3 \cdot k + seg]C[k] - X[3 \cdot (k-1) - seg]C[k-1] -$$
$$X[3 \cdot (k+1) + seg]C[k+1]|^2/6) +$$
$$|X[3 \cdot 143]C[143] - X[3 \cdot 144 + seg]C[144]|^2/2 -$$
$$|X[3 \cdot 283 + seg]C[283] - X[3 \cdot 282 - seg]C[282]|^2/2 +$$
$$\sum_{k=144}^{282} (|2 \cdot X[3 \cdot k + seg]C[k] - X[3 \cdot (k-1) + seg]C[k-1] -$$
$$X[3 \cdot (k+1) + seg]C[k+1]|^2/6)$$

where $NI_{par}$ denotes the partial noise-interference power value, $NI_{seg}$ denotes the power differences between the preamble tones, k denotes an index of a subcarrier to which a preamble tone is allocated, X[k] denotes a $k^{th}$ FFT subcarrier signal, C[k] denotes an element of a preamble code corresponding to the $k^{th}$ subcarrier, $N_{code}$ denotes a number of columns of the preamble code, and seg denotes an index indicating a current segment scheme.

3. The method of claim 1, wherein the calculating of the noise power value comprises calculating the noise power value by the equation, $$N = \frac{1}{N_{traffic} - N_{preamble}} \left( \sum_{k=-L}^{-1} X[k]^2 + \sum_{k=N_{preamble}}^{N_{preamble}+L} X[k]^2 \right)$$

$$L = \text{floor}\left( \frac{N_{traffic} - N_{preamble}}{2} \right)$$

where $N_{preamble}$ denotes a number of subcarriers allocated to the preamble allocation available area, $N_{traffic}$ denotes a number of subcarriers allocated to the traffic allocation available area, L denotes a half of a number of subcarriers allocated to the noise power estimation area, k denotes an index of a subcarrier to which a preamble tone is allocated, and X[k] denotes a $k^{th}$ FFT subcarrier signal.

4. The method of claim 1, wherein the calculating of the CINR comprises calculating the CINR by the equation, $$CINR = \frac{P_c}{NI_{par} + N(P_{bc} - 3)}$$

where $P_{bc}$ denotes a boosted carrier power gain, N denotes the noise power value, $NI_{par}$ denotes the partial noise-interference power value, and $P_c$ denotes the carrier power value.

5. An apparatus for estimating a Carrier-to-Interference and Noise Ratio (CINR) in a communication system, comprising:
  a Fast Fourier Transform (FFT) processor for generating a signal, including a traffic allocation available area for allocating a traffic signal and a preamble allocation available area for allocating a preamble signal, by FFT-processing a received symbol, the traffic allocation available area comprising the preamble allocation available area;
  a carrier power estimator for calculating power values of preamble tones included in the preamble allocation available area and for calculating a carrier power value using the power values of the preamble tones;
  a partial noise-interference power estimator for calculating a partial noise-interference power value using, (a) power differences between the preamble tones and (b) power values of remaining tones other than the preamble tones;
  a noise power estimator for calculating a noise power value using power values of tones included in a noise power estimation area, the noise power estimation area being an area of the traffic allocation available area other than the preamble allocation available area; and
  a CINR calculator for calculating the CINR using the carrier power value, the partial noise-interference power value, and the noise power value.

6. The apparatus of claim 5, wherein the partial noise-interference power estimator calculates the partial noise-interference power value by the equation, $$NI_{par} = \frac{\sum_{\substack{i=0 \\ i \neq seg}}^{2} \left( \sum_{\substack{k=0 \\ k \neq 142}}^{N_{code}-1} |X[3 \cdot k + i]|^2 \right) + NI_{seg}}{N_{code} - 1}$$

$NI_{seg} = |X[seg]C[0] - X[3+seg]C[1]|^2/2 -$ $|X[3 \cdot 140 + seg]C[141] - X[3 \cdot 140 + seg]C[140]|^2/2 +$ $\sum_{k=1}^{140} (|2 \cdot X[3 \cdot k + seg]C[k] - X[3 \cdot (k-1) - seg]C[k-1] -$ $X[3 \cdot (k+1) + seg]C[k+1]|^2/6) +$ $|X[3 \cdot 143]C[143] - X[3 \cdot 144 + seg]C[144]|^2/2 -$ $|X[3 \cdot 283 + seg]C[283] - X[3 \cdot 282 - seg]C[282]|^2/2 +$ $\sum_{k=144}^{282} (|2 \cdot X[3 \cdot k + seg]C[k] - X[3 \cdot (k-1) + seg]C[k-1] -$ $X[3 \cdot (k+1) + seg]C[k+1]|^2/6)$ where $NI_{par}$ denotes the partial noise-interference power value, $NI_{seg}$ denotes the power differences between the preamble tones, k denotes an index of a subcarrier to which a preamble tone is allocated, X[k] denotes a $k^{th}$ FFT subcarrier signal, C[k] denotes an element of a preamble code corresponding to the $k^{th}$ subcarrier, $N_{code}$ denotes a number of columns of the preamble code, and seg denotes an index indicating a current segment scheme.

7. The apparatus of claim 5, wherein the noise power estimator calculates the noise power value by the equation, $$N = \frac{1}{N_{traffic} - N_{preamble}} \left( \sum_{k=-L}^{-1} |X[k]|^2 + \sum_{k=N_{preamble}}^{N_{preamble}+L} |X[k]|^2 \right)$$

$$L = \text{floor}\left( \frac{N_{traffic} - N_{preamble}}{2} \right)$$

where $N_{preamble}$ denotes a number of subcarriers allocated to the preamble allocation available area, $N_{traffic}$ denotes a number of subcarriers allocated to the traffic allocation available area, L denotes a half of a number of subcarriers allocated to the noise power estimation area, k denotes an index of a subcarrier to which a preamble tone is allocated, and X[k] denotes a $k^{th}$ FFT subcarrier signal.

8. The apparatus of claim 5, wherein the CINR calculator calculates the CINR by the equation, $$CINR = \frac{P_c}{NI_{par} + N(P_{bc} - 3)}$$

where $P_{bc}$ denotes a boosted carrier power gain, N denotes the noise power value, $NI_{par}$ denotes the partial noise-interference power value, and $P_c$ denotes the carrier power value.

9. A method for estimating interference and noise in a communication system, comprising:
  generating a signal, including a traffic allocation available area for allocating a traffic signal and a preamble allocation available area for allocating a preamble signal, by FFT-processing a received symbol, the traffic allocation available area comprising the preamble allocation available area;
  calculating a partial noise-interference power value using, (a) power differences between preamble tones included in the preamble allocation available area and (b) power values of remaining tones other than the preamble tones in the preamble allocation available area;
  calculating a noise power value using power values of tones included in a noise power estimation area, the noise power estimation area being an area of the traffic allocation available area other than the preamble allocation available area; and
  calculating the interference and noise using the partial noise-interference power value and the noise power value.

10. The method of claim 9, wherein the calculating of the partial noise-interference power value comprises calculating the partial noise-interference power value by the equation, $$NI_{par} = \frac{\sum_{\substack{i=0 \\ i \neq seg}}^{2} \left( \sum_{\substack{k=0 \\ k \neq 142}}^{N_{code}-1} |X[3 \cdot k + i]|^2 \right) + NI_{seg}}{N_{code} - 1}$$

$NI_{seg} = |X[seg]C[0] - X[3+seg]C[1]|^2/2 - |X[3 \cdot 140 + seg]$

-continued
$$C[141] - X[3 \cdot 140 + seg]C[140]|^2/2 +$$

$$\sum_{k=1}^{140} (|2 \cdot X[3 \cdot k + seg]C[k] - X[3 \cdot (k-1) - seg]C[k-1] -$$

$$X[3 \cdot (k+1) + seg]C[k+1]|^2/6) +$$

$$|X[3 \cdot 143]C[143] - X[3 \cdot 144 + seg]C[144]|^2/2 -$$

$$|X[3 \cdot 283 + seg]C[283] - X[3 \cdot 282 - seg]C[282]|^2/2 +$$

$$\sum_{k=144}^{282} (|2 \cdot X[3 \cdot k + seg]C[k] - X[3 \cdot (k-1) + seg]C[k-1] -$$

$$X[3 \cdot (k+1) + seg]C[k+1]|^2/6)$$

where $NI_{par}$ denotes the partial noise-interference power value, $NI_{seg}$ denotes the power differences between the preamble tones, k denotes an index of a subcarrier to which a preamble tone is allocated, X[k] denotes a $k^{th}$ FFT subcarrier signal, C[k] denotes an element of a preamble code corresponding to the $k^{th}$ subcarrier, $N_{code}$ denotes a number of columns of the preamble code, and seg denotes an index indicating a current segment scheme.

11. The method of claim 9, wherein the calculating of the noise power value comprises calculating the noise power value by the equation, $$N = \frac{1}{N_{traffic} - N_{preamble}} \left( \sum_{k=-L}^{-1} X[k]^2 + \sum_{k=N_{preamble}}^{N_{preamble}+L} X[k]^2 \right)$$

$$L = \text{floor}\left(\frac{N_{traffic} - N_{preamble}}{2}\right)$$

where $N_{preamble}$ denotes a number of subcarriers allocated to the preamble allocation available area, $N_{traffic}$ denotes a number of subcarriers allocated to the traffic allocation available area, L denotes a half of a number of subcarriers allocated to the noise power estimation area, k denotes an index of a subcarrier to which a preamble tone is allocated, and X[k] denotes a $k_{th}$ FFT subcarrier signal.

12. The method of claim 9, wherein the calculating of the interference and noise comprises calculating the interference and noise by the equation, $$NI = NI_{par} + N(P_{bc} - 3)$$

where $P_{bc}$ denotes a boosted carrier power gain, N denotes the noise power value, and $NI_{par}$ denotes the partial noise-interference power value.

13. An apparatus for estimating interference and noise in a communication system, comprising:
a Fast Fourier Transform (FFT) processor for generating a signal, including a traffic allocation available area for allocating a traffic signal and a preamble allocation available area for allocating a preamble signal, by FFT-processing a received symbol, the traffic allocation available area comprising the preamble allocation available area;
a partial noise-interference power estimator for calculating a partial noise-interference power value using, (a) power differences between preamble tones included in the preamble allocation available area and (b) power values of remaining tones other than the preamble tones in the preamble allocation available area;
a noise power estimator for calculating a noise power value using power values of tones included in a noise power estimation area, the noise power estimation area being an area of the traffic allocation available area other than the preamble allocation available area; and
an interference and noise calculator for calculating the interference and noise using the partial noise-interference power value and the noise power value.

14. The apparatus of claim 13, wherein the partial noise-interference power estimator calculates the partial noise-interference power value by the equation, $$NI_{par} = \frac{\sum_{\substack{i=0 \\ i \neq seg}}^{2} \left( \sum_{\substack{k=0 \\ k \neq 142}}^{N_{code}-1} |X[3 \cdot k + i]|^2 \right) + NI_{seg}}{N_{code} - 1}$$

$$NI_{seg} = |X[seg]C[0] - X[3 + seg]C[1]|^2/2 - |X[3 \cdot 140 + seg]$$

$$C[141] - X[3 \cdot 140 + seg]C[140]|^2/2 +$$

$$\sum_{k=1}^{140} (|2 \cdot X[3 \cdot k + seg]C[k] - X[3 \cdot (k-1) - seg]C[k-1] -$$

$$X[3 \cdot (k+1) + seg]C[k+1]|^2/6) +$$

$$|X[3 \cdot 143]C[143] - X[3 \cdot 144 + seg]C[144]|^2/2 -$$

$$|X[3 \cdot 283 + seg]C[283] - X[3 \cdot 282 - seg]C[282]|^2/2 +$$

$$\sum_{k=144}^{282} (|2 \cdot X[3 \cdot k + seg]C[k] - X[3 \cdot (k-1) + seg]C[k-1] -$$

$$X[3 \cdot (k+1) + seg]C[k+1]|^2/6)$$

where $NI_{par}$ denotes the partial noise-interference power value, $NI_{seg}$ denotes the power differences between the preamble tones, k denotes an index of a subcarrier to which a preamble tone is allocated, X[k] denotes a FFT subcarrier signal, C[k] denotes an element of a preamble code corresponding to the $k^{th}$ subcarrier, $N_{code}$ denotes a number of columns of the preamble code, and seg denotes an index indicating a current segment scheme.

15. The apparatus of claim 13, wherein the noise power estimator calculates the noise power value by the equation, $$N = \frac{1}{N_{traffic} - N_{preamble}} \left( \sum_{k=-L}^{-1} X[k]^2 + \sum_{k=N_{preamble}}^{N_{preamble}+L} X[k]^2 \right)$$

$$L = \text{floor}\left(\frac{N_{traffic} - N_{preamble}}{2}\right)$$

where $N_{preamble}$ denotes a number of subcarriers allocated to the preamble allocation available area, $N_{traffic}$ denotes a number of subcarriers allocated to the traffic allocation available area, L denotes a half of a number of subcarriers allocated to the noise power estimation area, k denotes an index of a subcarrier to which a preamble tone is allocated, and X[k] denotes a $k^{th}$ FFT subcarrier signal.

16. The apparatus of claim 13, wherein the CINR calculator calculates the interference and noise by the equation, $$NI = NI_{par} + N(P_{bc} - 3)$$

where $P_{bc}$ denotes a boosted carrier power gain, N denotes the noise power value, and $NI_{par}$ denotes the partial noise-interference power value.

* * * * *